United States Patent
Na et al.

(10) Patent No.: US 12,453,687 B2
(45) Date of Patent: Oct. 28, 2025

(54) ANTI-DKK-1 ANTIBODY PROMOTING GROWTH OF HUMAN DERMAL PAPILLA CELL AND USE THEREOF

(71) Applicant: HAUUL BIO, Chuncheon-si (KR)

(72) Inventors: Hee-Jun Na, Chuncheon-si (KR);
Yun-Suk Lee, Chuncheon-si (KR);
Je-Ok Yoo, Chuncheon-si (KR);
Kwang-Soon Lee, Chuncheon-si (KR);
Ji Young Lee, Chuncheon-si (KR)

(73) Assignee: HAUUL BIO, Chuncheon-si (KR)

( * ) Notice: Subject to any disclaimer, the term of this patent is extended or adjusted under 35 U.S.C. 154(b) by 700 days.

(21) Appl. No.: 17/800,879

(22) PCT Filed: Sep. 27, 2021

(86) PCT No.: PCT/KR2021/013108
§ 371 (c)(1),
(2) Date: Aug. 18, 2022

(87) PCT Pub. No.: WO2022/108090
PCT Pub. Date: May 27, 2022

(65) Prior Publication Data
US 2023/0093472 A1     Mar. 23, 2023

(30) Foreign Application Priority Data

Nov. 20, 2020 (KR) .................. 10-2020-0156652

(51) Int. Cl.
| | |
|---|---|
| A61K 39/00 | (2006.01) |
| A61K 8/64 | (2006.01) |
| A61K 39/395 | (2006.01) |
| A61Q 7/00 | (2006.01) |
| C07K 16/00 | (2006.01) |
| C07K 16/18 | (2006.01) |
| C07K 16/46 | (2006.01) |

(52) U.S. Cl.
CPC ............... *A61K 8/64* (2013.01); *A61K 39/00* (2013.01); *A61Q 7/00* (2013.01); *C07K 16/18* (2013.01); *C07K 2317/565* (2013.01); *C07K 2317/622* (2013.01); *C07K 2319/10* (2013.01)

(58) Field of Classification Search
None
See application file for complete search history.

(56) References Cited

U.S. PATENT DOCUMENTS

| | | |
|---|---|---|
| 2010/0260754 A1 | 10/2010 | Chedid et al. |
| 2010/0291076 A1 | 11/2010 | Paralkar et al. |
| 2012/0023600 A1 | 1/2012 | Shulok et al. |
| 2018/0118840 A1 | 5/2018 | Obungu et al. |
| 2018/0325796 A1 | 11/2018 | Kim |

FOREIGN PATENT DOCUMENTS

| | | |
|---|---|---|
| KR | 10-2008-0085908 A | 9/2008 |
| KR | 10-2012-0007078 A | 1/2012 |
| KR | 10-2017-0055745 A | 5/2017 |

OTHER PUBLICATIONS

Kwack et al. Dickkopf 1 Promotes Regression of Hair Follicles. Journal of Investigative Dermatology (2012), vol. 132, 1554-1560. (Year: 2012).*
International Search Report for PCT/KR2021/013108 mailed Jan. 13, 2022 from Korean Intellectual Property Office.

* cited by examiner

*Primary Examiner* — Maher M Haddad
(74) *Attorney, Agent, or Firm* — Revolution IP, PLLC (57) ABSTRACT

The present invention relates to an anti-DKK-1 antibody promoting growth of human dermal papilla cells and a use thereof and, more particularly, to an anti-DKK-1 antibody comprising a heavy chain CDR and a light chain CDR of specific sequences, and an antigen-binding fragment thereof, wherein the anti-DKK-1 antibody promotes the growth of human dermal papilla cells and as such, is expected to be effectively used for promoting hair growth and preventing, alleviating, or treating hair loss.

8 Claims, 5 Drawing Sheets

Specification includes a Sequence Listing.

SEQUENCE LISTING

<160> NUMBER OF SEQ ID NOS: 18

<210> SEQ ID NO 1
<211> LENGTH: 13
<212> TYPE: PRT
<213> ORGANISM: Artificial Sequence
<220> FEATURE:
<223> OTHER INFORMATION: light chain CDR1

<400> SEQUENCE: 1

Ser Gly Ser Ser Ser Asn Ile Gly Ser Asn Asp Val Ser
1               5                   10

<210> SEQ ID NO 2
<211> LENGTH: 4
<212> TYPE: PRT
<213> ORGANISM: Artificial Sequence
<220> FEATURE:
<223> OTHER INFORMATION: light chain CDR2

<400> SEQUENCE: 2

Tyr Asp Ser Asn
1

<210> SEQ ID NO 3
<211> LENGTH: 9
<212> TYPE: PRT
<213> ORGANISM: Artificial Sequence
<220> FEATURE:
<223> OTHER INFORMATION: light chain CDR3

<400> SEQUENCE: 3

Gly Ala Trp Asp Asp Ser Leu Ser Gly
1               5

<210> SEQ ID NO 4
<211> LENGTH: 5
<212> TYPE: PRT
<213> ORGANISM: Artificial Sequence

```
<220> FEATURE:
<223> OTHER INFORMATION: heavy chain CDR1

<400> SEQUENCE: 4

Asn Tyr Ala Met Ser
1               5

<210> SEQ ID NO 5
<211> LENGTH: 9
<212> TYPE: PRT
<213> ORGANISM: Artificial Sequence
<220> FEATURE:
<223> OTHER INFORMATION: heavy chain CDR2

<400> SEQUENCE: 5

Gly Ile Tyr Pro Asp Asp Gly Ser Ile
1               5

<210> SEQ ID NO 6
<211> LENGTH: 8
<212> TYPE: PRT
<213> ORGANISM: Artificial Sequence
<220> FEATURE:
<223> OTHER INFORMATION: heavy chain CDR3

<400> SEQUENCE: 6

Arg Ser Glu Trp Glu Phe Asp Tyr
1               5

<210> SEQ ID NO 7
<211> LENGTH: 11
<212> TYPE: PRT
<213> ORGANISM: Artificial Sequence
<220> FEATURE:
<223> OTHER INFORMATION: TAT peptide

<400> SEQUENCE: 7

Tyr Gly Arg Lys Lys Arg Arg Gln Arg Arg Arg
1               5                   10

<210> SEQ ID NO 8
<211> LENGTH: 33
<212> TYPE: DNA
<213> ORGANISM: Artificial Sequence
<220> FEATURE:
<223> OTHER INFORMATION: TAT peptide

<400> SEQUENCE: 8
tatggccgca aaaaacgccg ccagcgccgc cgc                             33

<210> SEQ ID NO 9
<211> LENGTH: 20
<212> TYPE: DNA
<213> ORGANISM: Artificial Sequence
<220> FEATURE:
<223> OTHER INFORMATION: Primer (Wnt10b-F)

<400> SEQUENCE: 9
ctctgggatg tgtagccttc                                            20

<210> SEQ ID NO 10
<211> LENGTH: 20
<212> TYPE: DNA
<213> ORGANISM: Artificial Sequence
<220> FEATURE:
<223> OTHER INFORMATION: Primer (Wnt10b-R)
```

```
<400> SEQUENCE: 10
ggctctggag ttgagaagtg                                              20

<210> SEQ ID NO 11
<211> LENGTH: 25
<212> TYPE: DNA
<213> ORGANISM: Artificial Sequence
<220> FEATURE:
<223> OTHER INFORMATION: Primer (-catenin-F)

<400> SEQUENCE: 11
tctgaggaca agccacaaga ttaca                                        25

<210> SEQ ID NO 12
<211> LENGTH: 22
<212> TYPE: DNA
<213> ORGANISM: Artificial Sequence
<220> FEATURE:
<223> OTHER INFORMATION: Primer (-catenin-R)

<400> SEQUENCE: 12
tgggcaccaa tatcaagtcc aa                                           22

<210> SEQ ID NO 13
<211> LENGTH: 23
<212> TYPE: DNA
<213> ORGANISM: Artificial Sequence
<220> FEATURE:
<223> OTHER INFORMATION: Primer (LEF-F)

<400> SEQUENCE: 13
tgccaaatat gaataacgac cca                                          23

<210> SEQ ID NO 14
<211> LENGTH: 21
<212> TYPE: DNA
<213> ORGANISM: Artificial Sequence
<220> FEATURE:
<223> OTHER INFORMATION: Primer (LEF-R)

<400> SEQUENCE: 14
gagaaaagtg ctcgtcactg t                                            21

<210> SEQ ID NO 15
<211> LENGTH: 20
<212> TYPE: DNA
<213> ORGANISM: Artificial Sequence
<220> FEATURE:
<223> OTHER INFORMATION: Primer (VEGF-F)

<400> SEQUENCE: 15
tcttcaagcc atcctgtgtg                                              20

<210> SEQ ID NO 16
<211> LENGTH: 20
<212> TYPE: DNA
<213> ORGANISM: Artificial Sequence
<220> FEATURE:
<223> OTHER INFORMATION: Primer (VEGF-R)

<400> SEQUENCE: 16
gcgagtctgt gttttttgcag                                             20

<210> SEQ ID NO 17
<211> LENGTH: 20
```

```
<212> TYPE: DNA
<213> ORGANISM: Artificial Sequence
<220> FEATURE:
<223> OTHER INFORMATION: Primer (GAPDH-F)

<400> SEQUENCE: 17
gacatgccgc ctggagaaac                                              20

<210> SEQ ID NO 18
<211> LENGTH: 20
<212> TYPE: DNA
<213> ORGANISM: Artificial Sequence
<220> FEATURE:
<223> OTHER INFORMATION: Primer (GAPDH-R)

<400> SEQUENCE: 18
agcccaggat gcccttagt                                               20
```

ANTI-DKK-1 ANTIBODY PROMOTING GROWTH OF HUMAN DERMAL PAPILLA CELL AND USE THEREOF

CROSS REFERENCE TO PRIOR APPLICATIONS

This application is the 35 U.S.C. 371 national stage of international application PCT/KR2021/013108 filed on Sep. 27, 2021; which claims priority to Korean application 10-2020-0156652 filed on Nov. 20, 2020. The entire contents of each of the above-identified applications are hereby incorporated by reference.

TECHNICAL FIELD

The present disclosure relates to an anti-DKK-1 antibody promoting growth of human dermal papilla cells and a use thereof.

BACKGROUND ART

Human body has about 100,000 to 150,000 hairs which are formed in "hair follicles". The hair follicle has a dermal papilla in which small blood vessels are distributed to supply nutrients necessary for hair growth, and a sebaceous gland lies on the side of hair papilla to supply oil that gives shine to the hair. The hair follicle is composed of several different epithelial cells and dermal papilla cells (DPCs). DPCs are mesenchymally-derived fibroblasts present in the basal layer of hair follicles and play an important role in hair growth. In particular, minoxidil has been reported to have proliferative and anti-apoptotic effects on DPCs. Similarly, several reports have shown an increase in hair through proliferation of DPCs. Each hair has each different cycle, and grows and falls out while undergoing anagen, catagen, and telogen. The cycle repeats over 3-6 years, with an average of 50-100 hairs normally falling out a day. In general, alopecia refers to an abnormal increase in the number of hairs falling out due to reduced proportion of hair in anagen while the number of hairs in catagen and telogen increases during the cycle.

Overactiveness of male hormone, excessive sebum secretion, poor blood circulation, peroxides, hypofunction of scalp due to bacteria, genetic factors, aging, and stress are being discussed as causes of hair loss. Although many studies have been conducted, fundamental mechanism of hair loss is barely known. In addition, despite efforts to treat hair loss so far, only finasteride and minoxidil have been approved by the Food and Drug Administration (FDA, U.S.A) for treatment of hair loss. However, the effect of drugs is limited and temporary due to unpredictable effects and adverse effects. Better new treatments are needed to prevent hair loss and promote hair growth. In the case of agents that are known to prevent hair loss while being effective in hair growth promotion and hair growth, it is urgent to develop a composition with safety and efficacy ensured, since a lack of distinct efficacy as well as adverse effects regarding human safety and skin irritation are concerned.

DISCLOSURE

Technical Goals

An object of the present disclosure is to provide an anti-DKK-1 antibody or antigen-binding fragment thereof, specifically binding to Dickkopf-related protein 1 (DKK-1).

Another object of the present disclosure is to provide a fusion anti-DKK-1 antibody or antigen-binding fragment thereof, in which a TAT peptide is additionally bound to the anti-DKK-1 antibody or antigen-binding fragment thereof.

Another object of the present disclosure is to provide a nucleic acid molecule encoding the antibody or antigen-binding fragment thereof, a recombinant expression vector including the nucleic acid molecule, and a cell transformed with the recombinant expression vector.

Another object of the present disclosure is to provide a composition for detecting a DKK-1 antigen, including the antibody or antigen-binding fragment thereof as an active ingredient.

Another object of the present disclosure is to provide a cosmetic composition or health functional food composition for promoting hair growth or preventing hair loss, including the antibody or antigen-binding fragment thereof as an active ingredient.

Another object of the present disclosure is to provide a pharmaceutical composition for preventing or treating hair loss, including the antibody or antigen-binding fragment thereof as an active ingredient.

Technical Solutions

To achieve the above object, example embodiments of the present disclosure provide an anti-DKK-1 antibody or antigen-binding fragment thereof specifically binding to Dickkopf-related protein 1 (DKK-1), including a light chain variable region including a light chain CDR1 having an amino acid sequence represented by SEQ ID NO: 1, a light chain CDR2 having an amino acid sequence represented by SEQ ID NO: 2, and a light chain CDR3 having an amino acid sequence represented by SEQ ID NO: 3; and a heavy chain variable region including a heavy chain CDR1 having an amino acid sequence represented by SEQ ID NO: 4, a heavy chain CDR2 having an amino acid sequence represented by SEQ ID NO: 5, and a heavy chain CDR3 having an amino acid sequence represented by SEQ ID NO: 6.

In addition, example embodiments of the present disclosure provide a fusion anti-DKK-1 antibody or antigen-binding fragment thereof, in which a TAT peptide represented by SEQ ID NO: 7 is additionally bound to the antibody or an antigen-binding fragment thereof.

In addition, example embodiments of the present disclosure provide a nucleic acid molecule encoding the antibody or an antigen-binding fragment thereof.

In addition, example embodiments of the present disclosure provide a recombinant expression vector including the nucleic acid molecule.

In addition, example embodiments of the present disclosure provide a cell transformed with the recombinant expression vector.

In addition, example embodiments of the present disclosure provide a composition for detecting a DKK-1 antigen, including the antibody or an antigen-binding fragment thereof as an active ingredient.

In addition, example embodiments of the present disclosure provide a cosmetic composition for promoting hair growth or preventing hair loss, including the antibody or an antigen-binding fragment thereof as an active ingredient.

In addition, example embodiments of the present disclosure provide a health functional food composition for promoting hair growth or preventing hair loss, including the antibody or an antigen-binding fragment thereof as an active ingredient.

In addition, example embodiments of the present disclosure provide a pharmaceutical composition for preventing or treating hair loss, including the antibody or an antigen-binding fragment thereof as an active ingredient.

Advantageous Effects

Example embodiments of the present disclosure relate to an anti-DKK-1 antibody promoting the growth of human dermal papilla cells and a use thereof. More particularly, example embodiments of the present disclosure relate to an anti-DKK-1 antibody or antigen-binding fragment thereof, including a heavy chain CDR and a light chain CDR of a specific sequence. The anti-DKK-1 antibody is expected to be useful for promoting hair growth, and preventing, alleviating, or treating hair loss by promoting the growth of human dermal papilla cells.

BEST MODE

An example embodiment of the present disclosure provides an anti-DKK-1 antibody or antigen-binding fragment thereof specifically binding to Dickkopf-related protein 1 (DKK-1), including a light chain variable region including a light chain CDR1 having an amino acid sequence represented by SEQ ID NO: 1, a light chain CDR2 having an amino acid sequence represented by SEQ ID NO: 2, and a light chain CDR3 having an amino acid sequence represented by SEQ ID NO: 3; and a heavy chain variable region including a heavy chain CDR1 having an amino acid sequence represented by SEQ ID NO: 4, a heavy chain CDR2 having an amino acid sequence represented by SEQ ID NO: 5, and a heavy chain CDR3 having an amino acid sequence represented by SEQ ID NO: 6.

In addition, an example embodiment of the present disclosure provides a fusion anti-DKK-1 antibody or antigen-binding fragment thereof, in which a TAT peptide represented by SEQ ID NO: 7 is additionally bound to the antibody or antigen-binding fragment thereof.

Here, the CDRs having amino acids represented by SEQ ID NO: 1 to SEQ ID NO: 6 are shown in Table 1.

In addition, the amino acid sequence of the TAT peptide used in an example embodiment of the present disclosure is "YGRKKRRQRRR" (SEQ ID NO: 7), and the nucleotide sequence of the TAT peptide is "TAT GGC CGC AAA AAA CGC CGC CAG CGC CGC CGC" (SEQ ID NO: 8).

The term "antibody" as used herein refers to a protein molecule which includes an immunoglobulin molecule having immunological reactivity with a specific antigen and plays a role as a receptor that specifically recognizes an antigen. For example, the antibody may all include a monoclonal antibody, a polyclonal antibody, a full-length antibody, and an antibody fragment. In addition, the term "antibody" as used herein may include a bivalent or bispecific molecule (e.g., a bispecific antibody), a diabody, a triabody, or a tetrabody.

The term "monoclonal antibody" as used herein refers to an antibody molecule of a single molecular composition obtained from a group of substantially identical antibodies, and such monoclonal antibody exhibits single avidity and affinity for a specific epitope, unlike a polyclonal antibody capable of binding to multiple epitopes. The term "full-length antibody" as used herein has a structure with two full-length light chains and two full-length heavy chains, wherein each light chain is connected to the heavy chain by a disulfide bond. The heavy chain constant region has gamma (γ), mu (μ), alpha (α), delta (δ), and epsilon (ε) types with subclasses including gamma 1 (γ1), gamma 2 (γ2), gamma 3 (γ3), gamma 4 (γ4), alpha 1 (α1), and alpha 2 (α2). The constant region of the light chain has kappa (κ) and lambda (λ) types. IgG is a subtype, including IgG1, IgG2, IgG3, and IgG4.

The term "heavy chain" as used herein may include both a full-length heavy chain and fragment thereof, including a variable region VH including an amino acid sequence having a variable region sequence sufficient to give specificity to an antigen and three constant regions including CH1, CH2, and CH3. In addition, the term "light chain" as used herein may include both a full-length light chain and fragment thereof, including a variable region VL including an amino acid sequence having a variable region sequence sufficient to give specificity to an antigen and a constant region CL.

In an example embodiment of the present disclosure, the terms "fragment", "antibody fragment", and "antigen-binding fragment" are used interchangeably to refer to any fragment of the antibody of an example embodiment of the present disclosure, having an antigen-binding function of the antibody. Exemplary antigen-binding fragments include Fab, Fab', F(ab')2, and Fv, but are not limited thereto.

The antibody or antigen-binding fragment thereof of an example embodiment of the present disclosure may include not only the sequence of the antibody described herein, but also a biological equivalent thereof within a range that the ability to specifically bind to DKK-1 is exhibited. For example, additional modifications may be applied to the amino acid sequence of an antibody to further improve binding affinity and/or other biological properties of the antibody. Such modifications include, for example, deletions, insertions, and/or substitutions of amino acid sequence residues of the antibody. Such amino acid variations are made based on the relative similarity of amino acid side chain substituents, such as hydrophobicity, hydrophilicity, charge, and size. According to analysis for the size, shape, and type of the amino acid side chain substituents, it is found that arginine, lysine, and histidine are all positively charged residues; alanine, glycine, and serine have similar sizes; and phenylalanine, tryptophan, and tyrosine have similar shapes. Therefore, based on this, arginine, lysine, and histidine; alanine, glycine, and serine; and phenylalanine, tryptophan, and tyrosine may be considered to be biologically functional equivalents.

An example embodiment of the present disclosure also provides a nucleic acid molecule encoding the antibody or antigen-binding fragment thereof.

The term "nucleic acid molecule" as used herein may comprehensively include DNA (gDNA and cDNA) and RNA molecules, and nucleotides, a basic structural unit of nucleic acid molecules, include natural nucleotides as well as analogs in which sugar or base sites are modified. The sequences of the nucleic acid molecules encoding the heavy and light chain variable regions of an example embodiment of the present disclosure may be modified, and the modification includes additions, deletions, or non-conservative or conservative substitutions of nucleotides.

In addition, an example embodiment of the present disclosure provides a recombinant expression vector including the nucleic acid molecule.

In an example embodiment of the present disclosure, the term "vector" as used herein refers to a self-replicating DNA molecule used to carry a clonal gene (or another piece of clonal DNA).

In an example embodiment of the present disclosure, the term "expression vector" as used herein refers to a recombinant DNA molecule including a desired coding sequence and an appropriate nucleic acid sequence essential for expressing a coding sequence operably linked in a specific host organism. The expression vector may preferably include one or more selectable markers. The marker refers to a nucleic acid sequence having characteristics selectable by a conventional chemical method, including all genes capable of distinguishing transformed cells from non-transformed cells. Examples include antibiotic resistance genes such as ampicillin, kanamycin, geneticin (G418), bleomycin, hygromycin, and chloramphenicol but are limited thereto, and may be appropriately selected by those skilled in the art.

To express the DNA sequences of an example embodiment of the present disclosure, any one of a wide variety of expression regulatory sequences may be used in the vector. Examples of useful expression regulatory sequences may include, for example, early and late promoters of SV40 or adenovirus, promoters and enhancers of CMV, LTR of retrovirus, lac system, trp system, TAC or TRC system, T3 and T7 promoters, major operator and promoter regions of phage lambda, regulatory regions of fd code protein, promoters for 3-phosphoglycerate kinase or other glycolytic enzymes, promoters of the phosphatases such as Pho5, promotors of yeast alpha-crossing system and other sequences of composition and induction known to regulate expression of genes in prokaryotic or eukaryotic cells or viruses thereof, and various combinations thereof.

For the vector expressing the antibody of an example embodiment of the present disclosure, a vector system in which a light chain and a heavy chain are expressed simultaneously in a single vector or a system in which a light chain and a heavy chain are expressed in separate vectors respectively may all be possible. In the latter case, both vectors are introduced into host cells through co-transformation and targeted transformation. Co-transformation is a method of selecting cells expressing both the light and heavy chains after simultaneously introducing each vector DNA encoding the light and heavy chains into a host cell. Targeted transformation is a method of selecting cells transformed with a vector including a light chain (or a heavy chain) and re-transforming the selected cells expressing the light chain with a vector including a heavy chain (or a light chain) to finally select cells expressing both the light chain and the heavy chain.

In addition, an example embodiment of the present disclosure provides a cell transformed with the recombinant expression vector.

Cells capable of stably and continuously cloning and expressing the vector of an example embodiment of the present disclosure may be any host cell known in the art, including, for example, prokaryotic host cells such as *Escherichia coli, Bacillus* sp. strains such as *Bacillus subtilis* and *Bacillus thuringiensis, Streptomyces, Pseudomonas* (e.g., *Pseudomonas putida*), *Proteus mirabilis* or *Staphylococcus* (e.g., *Staphylococcus carnosus*), but are not limited thereto.

In the method for preparing the antibody or antigen-binding fragment thereof, the transformed cell may be cultured according to an appropriate medium and culture conditions known in the art. Such a culture process may be easily adjusted to be used by those skilled in the art depending on the selected strain. Cell culture is divided into suspension culture and adherent culture depending on the cell growth type, and batch, fed-batch, and continuous culture methods depending on the culture type. The medium used for culture should suitably satisfy the requirements for a particular strain.

In addition, an example embodiment of the present disclosure provides a composition for detecting DKK-1 antigen, including the antibody or antigen-binding fragment thereof as an active ingredient.

In addition, an example embodiment of the present disclosure provides a cosmetic composition for promoting hair growth or preventing hair loss, including the antibody or antigen-binding fragment thereof as an active ingredient.

Preferably, the composition may promote the growth of human dermal papilla cells, but is not limited thereto.

Preferably, the composition may increase expression of Wnt10b, β-catenin, and LEF which are Wnt/β-catenin signaling factors, and VEGF which is a vascular endothelial growth factor, but is not limited thereto.

The cosmetic composition may include, in addition to the active ingredient, conventional adjuvants such as stabilizers, solubilizers, vitamins, pigments, and fragrances, and carriers.

The cosmetic composition may be prepared in any formulation conventionally prepared in the art, and may have a formulation selected from the group consisting of external skin ointment, cream, softening toner, nutrient toner, pack, essence, hair tonic, shampoo, rinse, hair conditioner, hair treatment, gel, skin lotion, skin softener, skin toner, astringent, lotion, milk lotion, moisture lotion, nourishing lotion, massage cream, nourishing cream, eye cream, moisture cream, hand cream, foundation, nourishing essence, sunscreen, soap, cleansing foam, cleansing lotion, cleansing cream, body lotion, and body cleanser, but is not limited thereto. The composition of each of these formulations may contain various bases and additives necessary and appropriate for formulating the formulation, and the types and amounts of the components may be easily selected by those skilled in the art.

When the formulation is a paste, cream or gel, animal oil, vegetable oil, wax, paraffin, starch, tragacanth, cellulose derivative, polyethylene glycol, silicone, bentonite, silica, talc, or zinc oxide may be used as a carrier component.

When the formulation is powder or a spray, lactose, talc, silica, aluminum hydroxide, calcium silicate, or polyamide powder may be used as a carrier component, and in particular, in the case of a spray, a booster such as chlorofluorohydrocarbon, propane/butane, or dimethyl ether may be additionally included.

When the formulation is a solution or an emulsion, a solvent, a solubilizer, or an emulsifier is used as a carrier component, including, for example, water, ethanol, isopropanol, ethyl carbonate, ethyl acetate, benzyl alcohol, benzyl benzoate, propylene glycol, 1,3-butylglycol oil, glycerol fatty ester, polyethylene glycol, or fatty acid ester of sorbitan.

When the formulation is a suspension, water, a liquid diluent such as ethanol or propylene glycol, a suspending agent such as ethoxylated isostearyl alcohol, polyoxyethylene sorbitol ester, and polyoxyethylene sorbitan ester, microcrystalline cellulose, aluminum metahydroxide, bentonite, agar, or tragacanth may be used as a carrier component.

In addition, an example embodiment of the present disclosure provides a health functional food composition for promoting hair growth or preventing hair loss, including the antibody or antigen-binding fragment thereof as an active ingredient.

The health functional food composition may be provided in the form of powder, granules, tablets, capsules, syrups, beverages, or pills. The health food composition is used together with other food or food additives in addition to the composition according to an example embodiment of the present disclosure as an active ingredient, and may be appropriately applied according to the conventional method. The mixed amount of the active ingredient may be suitably determined depending on the purpose of use thereof such as prophylactic, health, or therapeutic treatment.

The effective dose of the antibody or antigen-binding fragment thereof included in the health functional food composition may be used according to the effective dose of the pharmaceutical composition, but for the long-term intake for a purpose of health and hygiene or health control, the dose may be less than the above range. In addition, since there is no problem in terms of safety, it is certain that the dose may be beyond the above range.

The type of health food is not particularly limited, and examples may include meat, sausage, bread, chocolate, candy, snacks, confectionery, pizza, ramen, other noodles, gum, dairy products such as ice cream, various soups, beverages, tea, drinks, alcoholic beverages, and vitamin complexes.

In addition, an example embodiment of the present disclosure provides a pharmaceutical composition for preventing or treating hair loss, including the antibody or antigen-binding fragment thereof as an active ingredient.

The pharmaceutical composition of an example embodiment of the present disclosure may further include a pharmaceutically acceptable carrier, and the pharmaceutically acceptable carrier is commonly used in the formulation, including lactose, dextrose, sucrose, sorbitol, mannitol, starch, gum acacia, calcium phosphate, alginate, gelatin, calcium silicate, microcrystalline cellulose, polyvinylpyrrolidone, cellulose, water, syrup, methylcellulose, methyl hydroxybenzoate, propyl hydroxybenzoate, talc, magnesium stearate, and mineral oil, but is not limited thereto. The composition of an example embodiment of the present disclosure may further include a lubricant, a wetting agent, a sweetener, a flavoring agent, an emulsifier, a suspending agent, and a preservative, in addition to the above components.

The pharmaceutical composition of an example embodiment of the present disclosure may be administered orally or parenterally, and in the case of parenteral administration, administration may be performed by intravenous injection, subcutaneous injection, intramuscular injection, intraperitoneal injection, endothelial administration, topical administration, intranasal administration, intrapulmonary administration, and rectal administration. When administered orally, the composition for oral administration may be formulated by coating an active agent or protecting the same from degradation in the stomach since protein or peptide is digested, and the composition of an example embodiment of the present disclosure may be administered by any device capable of delivering the active ingredient to a target cell.

A suitable dose of the pharmaceutical composition of an example embodiment of the present disclosure varies depending on factors such as formulation method, administration type, age, weight, sex, pathological condition, food, administration time, administration route, excretion rate, and response sensitivity of a patient, and a generally skilled physician may easily determine and prescribe an effective dose for the desired treatment or prevention.

The pharmaceutical composition of an example embodiment of the present disclosure may be formulated in a unit dosage form by using a pharmaceutically acceptable carrier and/or excipient or prepared by being introduced into a multi-dose container according to a method that may be easily carried out by a person of ordinary skill in the art to which the present disclosure pertains. In this case, the formulation may be in the form of a solution, suspension, or emulsion in oil or aqueous medium, or may be in the form of an extract, powder, suppository, powder, granule, tablet, or capsule, and may additionally include a dispersing agent or a stabilizer.

The composition of an example embodiment of the present disclosure may be administered as an individual therapeutic agent or in combination with other therapeutic agents, and may be administered sequentially or simultaneously with conventional therapeutic agents.

"Hair loss" as used herein refers to a phenomenon in which hair falls off from the scalp or a state in which the hair becomes loosened or thin, "hair loss prevention" refers to preventing and suppressing the phenomenon of hair loss as described above, and "hair growth promotion" refers to not only promoting the generation of new hair, but also allowing the existing hair to grow healthy.

"Hair growth" generally takes place in anagen, and is promoted by induction from telogen to anagen and delay from anagen to catagen. The hair cycle may be divided into three major phases which are known as anagen, catagen, and telogen. During the anagen, hair follicles grow deep into the skin with rapid cell proliferation, and hair formation takes place. The next phenomenon is catagen, a transitional period in which cell division is markedly interrupted. In this process, hair follicles gradually degenerate, and hair growth stops. In the next phase called telogen, the degenerative hair follicles include germs having densely packed dermal papilla cells. The initiation of new anagen from telogen is induced, in the embryo, by rapid cell proliferation, expansion of the dermal papilla, and the synthesis of basal membrane factors.

MODES FOR CARRYING OUT INVENTION

Hereinafter, an example embodiment of the present disclosure will be described in more detail with examples. These examples are merely for illustrating an example embodiment of the present disclosure in more detail, and it will be apparent to those of ordinary skill in the art that the scope of the present disclosure is not limited by the examples according to the gist of the present disclosure.

<Example 1> Selection of Anti-DKK-1 scFv Antibody

1. Implement of Bio-Panning

Bio-panning was performed using the OPAL library with a diversity of 7.6×10$^9$. 3 µg of DKK-1 (Dickkopf-related protein 1) antigen was immobilized onto epoxy magnetic beads and subjected to a reaction with input phages. The output titer was measured by elution of the phage reacted with the antigen. By measuring the input and output titers every time, information on the bio-panning was obtained, and whether the operation was carried out normally was checked. The amount of input phage used each time was less than or equal to 1×10$^{12}$ cfu/mL (1×10$^{12}$ cfu/mL≥). It was found that the output was amplified as the number of phases of bio-panning increases (1$^{st}$—1.89×10$^7$ cfu/mL, 2$^{nd}$—2.81×10$^7$ cfu/mL, 3$^{rd}$—4.40×10$^7$ cfu/mL, 4$^{th}$—7.50×10$^8$ cfu/mL). Thus, it was found that the bio-panning was performed normally.

2. ELISA Assay

Figure 1:
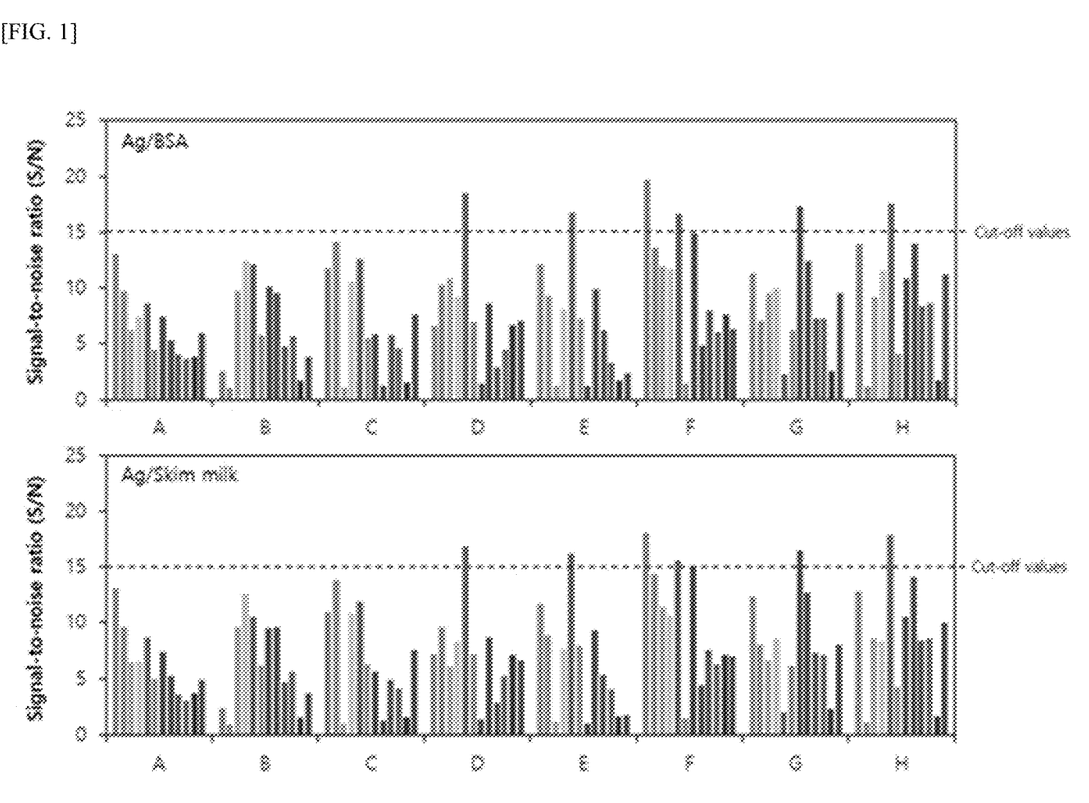
FIG. 1 shows results of ELISA assay for selection of anti-DKK-1 scFv antibody.

An ELISA assay was performed for the selection antibodies with high sensitivity and high specificity. *E. coli* was infected with obtained phage and spread on an LB plate added with antibiotics. After culture in an incubator at 30° C. for 16 hours, the colonies formed thereby were randomly collected. After each colony was inoculated in an LB medium, cultured, and treated with IPTG to express scFv antibody, *Escherichia coli* was lysed to obtain a soluble fraction, followed by ELISA. First, 50 ng of DKK-1 antigen was immobilized on a 96-well plate, and blocking was performed with PBS containing 3% BSA. After 1 hour, the cell lysates obtained above were treated, and a reaction was performed at 37° C. for 2 hours. After washing the plate 3 times with PBS containing 0.1% Tween20, the HRP-conjugated anti-HA antibody was diluted in a blocking solution in a ratio of in 1:1000, followed by reaction at 37° C. for 1 hour. After washing the plate 5 times with PBS containing 0.1% Tween20, color development was performed with TMB substrate, and 96 scFv antibodies bound to the antigen were measured with an ELISA reader. 38 types were selected by arbitrarily setting OD$_{450}$ value of 1.3 as a positive guideline. To exclude antibodies existing due to non-specific reactions among the primarily selected antibodies, PBS containing 3% BSA or 3% skim milk was treated to a 96-well plate in which no antigen was treated for blocking, and measurement was followed in the same manner as above. The signal-to-noise ratio (S/N) was calculated using each measured OD$_{450}$ value, and the final six types of scFv antibody clones were selected by setting the S/N value of 15 as cut-off values (FIG. 1).

3. Sequencing of Anti-DKK-1 scFv Antibody

Since there is a possibility that duplicate clones exist among the positive clones selected via ELISA assay, sequencing was necessary. Individual clones were selected through sequencing for the six types of positive clones of the selected anti-DKK-1 scFv. As a result of sequencing, it was identified that 5 out of 6 positive clones were individual clones.

<Example 2> Purification and Sensitivity Analysis of Selected Anti-DKK-1 scFv Antibody 1. Purification of Anti-DKK-1 scFv Antibody Anti-DKK-1 F1 scFv antibody (Table 1) having the highest antigen-binding ability among the five selected types was purified. ER2738 *E. coli* cells in which anti-DKK-1 scFv clone (F1) is transformed were cultured in 500 mL of SB media and then lysed using 1×TES buffer. Cell lysates were reacted with 0.5 mL of Ni beads and eluted using imidazole.

TABLE 1

| Target | Clone | Light chain CDR sequence | | | Heavy chain CDR sequence | | |
| --- | --- | --- | --- | --- | --- | --- | --- |
| | | CDR1 | CDR2 | CDR3 | CDR1 | CDR2 | CDR3 |
| DKK-1 | F1 | SGSSSNIGSNDVS (SEQ ID NO: 1) | YDSN (SEQ ID NO: 2) | GAWDDSLSG (SEQ ID NO: 3) | NYAMS (SEQ ID NO: 4) | GIYPDDGSI (SEQ ID NO: 5) | RSEWEFDY (SEQ ID NO: 6) |

2. Sensitivity Analysis of Purified Anti-DKK-1 scFv Antibody

Figure 2:
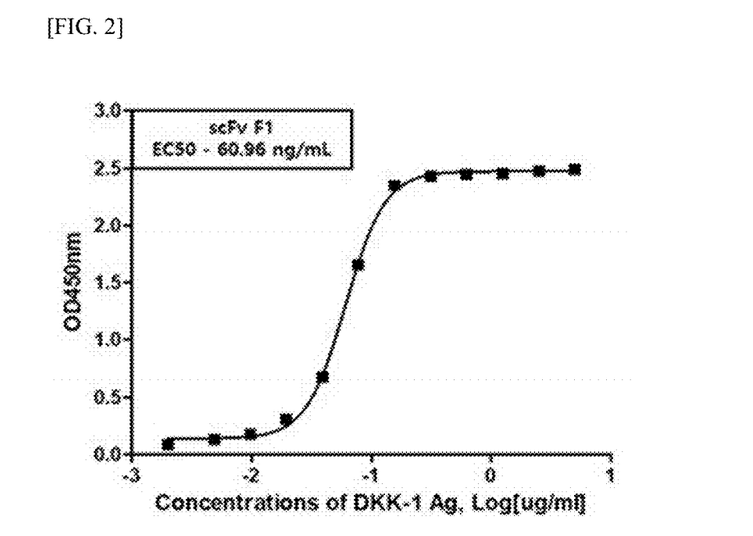
FIG. 2 shows a result of sensitivity analysis of anti-DKK-1 F1 scFv antibody.

Sensitivity analysis of the purified anti-DKK-1 F1 scFv antibody was performed. ELISA assay was used for sensitivity analysis. First, various concentrations of DKK-1 antigen were immobilized on an ELISA plate, and then 10 µg/mL of anti-DKK-1 F1 scFv antibody was treated. The analysis was performed using HRP-conjugated anti-HA antibody diluted in a ratio of 1:1000. As a result, the EC50 of the anti-DKK-1 F1 scFv antibody was analyzed to be 60.96 ng/mL (FIG. 2).

<Example 3> Preparation of Cell-Permeable Anti-DKK-1 scFv Antibody

1. Preparation of TAT-Anti-DKK-1 scFv DNA Construct

PCR products in which a restriction enzyme site and TAT were inserted were produced using a primer for the previously selected anti-DKK-1 F1 scFv. The PCR product (insert) and pET28a(+) vector were respectively treated with 1 µL of EcoR I and 1 µL of Xho I and reacted at 37° C. for 1 hour, followed by purification. The concentrations of the purified vector and insert were measured with nanodrops, and ligation was performed at room temperature for 16 hours using T4 ligase for each ratio of the vector and the insert. After ligation and transformation in DH5a, cells were spread on kanamycin-added LB plate and cultured at 37° C. for 16 hours. The next day, colonies were taken and inoculated into kanamycin-added LB media, followed by culture at 37° C. for 16 hours. The next day, to check whether the insert was inserted, the plasmid was separated for restriction with Xho I and EcoR I, and the band was identified by electrophoresis in 1% agarose gel.

2. Purification of TAT-Anti-DKK-1 scFv Antibody

Figure 3:
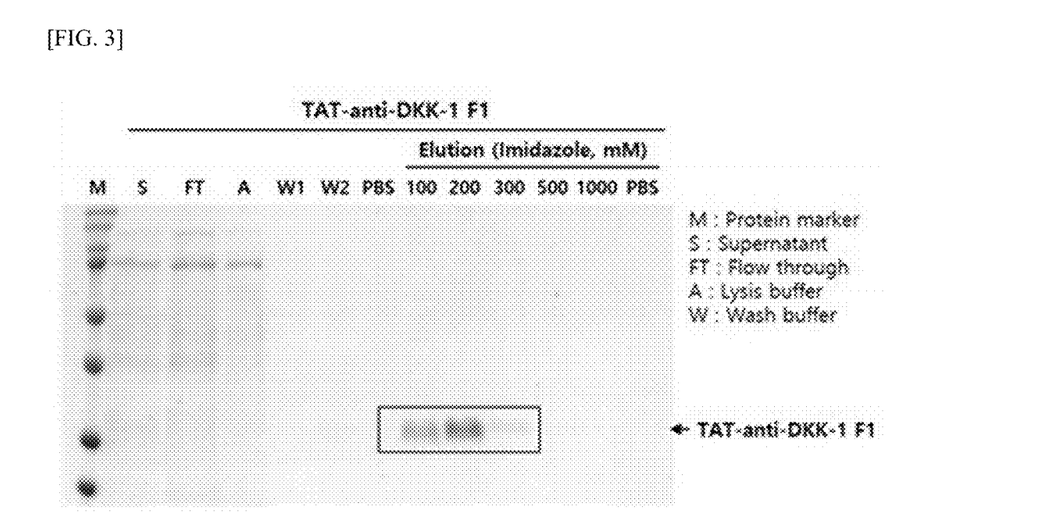
FIG. 3 shows a result of the size and protein purity via SDS-PAGE after purification of cell-permeable anti-DKK-1 F1 scFv antibody protein.

The cloned TAT-anti-DKK-1 F1 scFv antibody clone was transformed into a BL21(DE3) *E. coli* host. Transformants were cultured in kanamycin-containing LB medium until the OD$_{600}$ value reached 0.6, and expression was induced by treatment of 0.3 mM IPTG at 16° C. Cells obtained by centrifugation of the culture medium were suspended in a lysis buffer (50 mM Tris-HCl, pH 7.5, 150 mM NaCl), disrupted using an ultrasonicator, and then centrifuged to obtain a supernatant. A resin having affinity to Ni-NTA was used for pure isolation and purification of only the induction-expressed protein, and the purified protein was identified through SDS-PAGE analysis (FIG. 3).

<Example 4> Cytotoxicity Test of Cell-Permeable Anti-DKK-1 scFv Antibody

To investigate the cytotoxicity against TAT-anti-DKK-1 F1 scFv antibody, human dermal papilla cells (hDPCs) were dispensed in a 96-well plate by $1\times10^3$ cells and cultured in an incubator containing 5% carbon dioxide with the temperature maintained at 37° C. After 24 hours, TAT-anti-DKK-1 scFv was treated by concentration and then additionally cultured under the same culture conditions. After culture, MTT {3-(4,5-dimethylthiazol-2-yl)-2,5-diphenyltetrazolium bromide} solution was added and reacted for 3 hours. Then, the culture medium was removed, and DMSO (dimethyl sulfoxide) was added by 100 μL each. After shaking for 15 minutes, absorbance was measured at 570 nm with an ELISA reader. As shown in Table 2, when TAT-anti-DKK-1 F1 scFv was treated at concentrations of 0.1, 1, 5, 10, 50, and 100 ppm, there was little change in cell shape and cell viability up to a concentration of 100 ppm. Therefore, it was found that the TAT-anti-DKK-1 F1 scFv antibody was a substance with no cytotoxicity up to a concentration of 100 ppm.

TABLE 2

| TAT-anti-DKK-1 F1 | | |
| --- | --- | --- |
| Concentration (ppm) | Cell viability (%) | Error |
| 0 | 100 | 1.505 |
| 0.1 | 88.31 | 1.93 |
| 1 | 94.52 | 0.94 |
| 5 | 110.93 | 2.20 |
| 10 | 109.70 | 1.95 |
| 50 | 117.86 | 1.45 |
| 100 | 134.55 | 2.32 |

Figure 4:
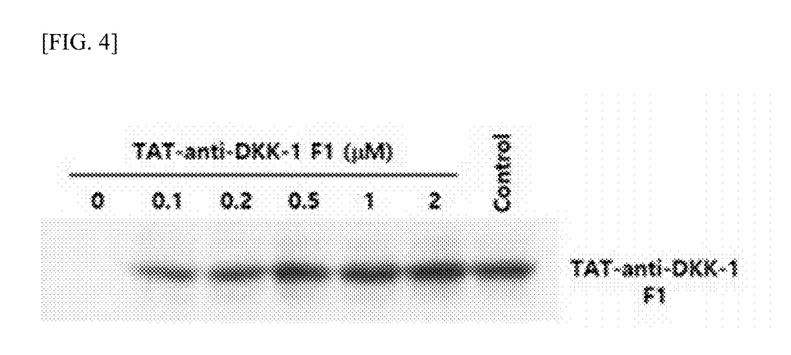
FIG. 4 shows a result of cell permeability of cell-permeable anti-DKK-1 F1 scFv antibody via Western blot.

<Example 5> Cell Permeability Analysis of Cell-Permeable Anti-DKK-1 scFv Antibody Western blot analysis was applied to identify cell permeability of the TAT-anti-DKK-1 F1 scFv antibody. After dispensing human-derived skin cells in a 6-well plate by $1\times10^5$ cells, RPMI medium containing 10% fetal bovine serum (FBS), penicillin (100 U/mL), and streptomycin (100 μg/mL) was added, followed by culture in an incubator containing 5% carbon dioxide with temperature maintained at 37° C. After culture, the culture was replaced with 1.5 mL of fresh FBS-free culture solution and treated with various concentrations of TAT-anti-DKK-1 F1 scFv antibody. 1 hour after the treatment, the cells were sufficiently washed with PBS and collected, and the degree of intracellular permeation of the TAT-anti-DKK-1 F1 scFv antibody was identified by Western blot. In order to find whether the intracellularly permeated TAT-anti-DKK-1 F1 scFv antibody was identified at the correct site (size), purely purified TAT-anti-DKK-1 F1 scFv antibody (Control) was also electrophoresed. As shown in FIG. 4, it was found that the TAT-anti-DKK-1 F1 scFv antibody effectively permeated the cells in a concentration-dependent manner.

Figure 5:
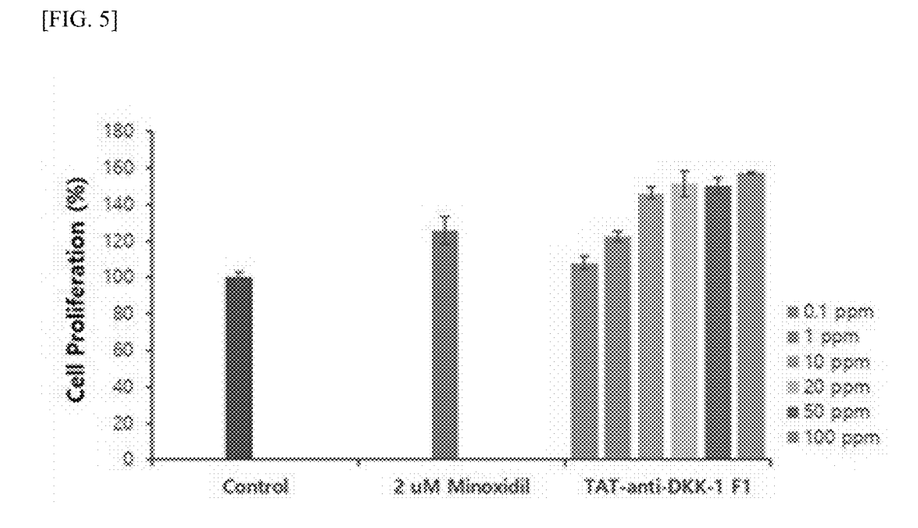
FIG. 5 shows a result of cell proliferation efficacy evaluation of cell-permeable anti-DKK-1 F1 scFv antibody.

<Example 6> Analysis of Human Dermal Papilla Cell Growth Activity by Cell-Permeable Anti-DKK-1 scFv Antibody To investigate the effect of TAT-anti-DKK-1 F1 scFv antibody on cell proliferation, human dermal papilla cells (hDPCs) were dispensed in a 96-well plate by $1\times10^3$ cells and cultured in an incubator containing 5% carbon dioxide with temperature maintained at 37° C. After 24 hours, the culture was replaced with fresh FBS-free DMEM medium, culture was followed for a certain period of time. After that, various concentrations of TAT-anti-DKK-1 F1 scFv antibody were treated. As a positive control, 2 μM of minoxidil effective in proliferation of DPCs and having an anti-apoptotic effect was used. Each sample was treated and cultured for 72 hours, and cell proliferation assay was performed using cell counting kit-8 (CCK-8). As a result, the TAT-anti-DKK-1 F1 scFv antibody significantly increased in a concentration-dependent manner compared to minoxidil which is the commercially available alopecia treatment, and activated cell proliferation up to 150% or higher in a group treated with 20-100 ppm (FIG. 5).

<Example 7> Analysis of Changes in Gene Expression Related to Hair Growth Regulation by Cell-Permeable Anti-DKK-1 scFv Antibody 1. Analysis of Wnt/β-Catenin Signaling Activation Recently, to investigate the effect of TAT-anti-DKK-1 F1 scFv on Wnt/β-catenin signaling, which is known to play a major role in hair growth, changes in expression of Wnt/β-catenin signaling factors including Wnt10b, β-catenin, and LEF were measured using real-time PCR. Human dermal papilla cells, hDPCs, were cultured in an incubator containing 5% carbon dioxide with temperature maintained at 37° C. After culture, 10 ppm of TAT-anti-DKK-1 F1 scFv antibody and 10 ppm of minoxidil as a positive control were treated, followed by additional culture under the same culture conditions. After culture, the cells were harvested with 300 μL of TRIzol and transferred to a 1.5 mL tube. The cells were then added and mixed with 50 μL of chloroform and left at room temperature for 5 minutes. Then, centrifugation was performed at 4° C., 15,000 rpm for 15 minutes, and the supernatant was transferred to a new tube to be mixed with the same amount of 2-propanol. After leaving the mixture at room temperature for 5 minutes, centrifugation was performed at 4° C., 12,000 rpm for 20 minutes. After centrifugation, 2-propanol was discarded, and 300 μL of 75% ethanol was added, followed by centrifugation at 4° C., 10,000 rpm for 10 minutes. Then, 75% ethanol was discarded, and RNA pellets were dried at room temperature to remove the remaining ethanol. After 30 μL of DEPC-treated purified water was added to the pellet for dissolvation, quantification was conducted at 260 nm. RT (reverse transcription)-PCR was performed using 1 μg of total RNA and TOPscript RT dry mix.

Figure 6:
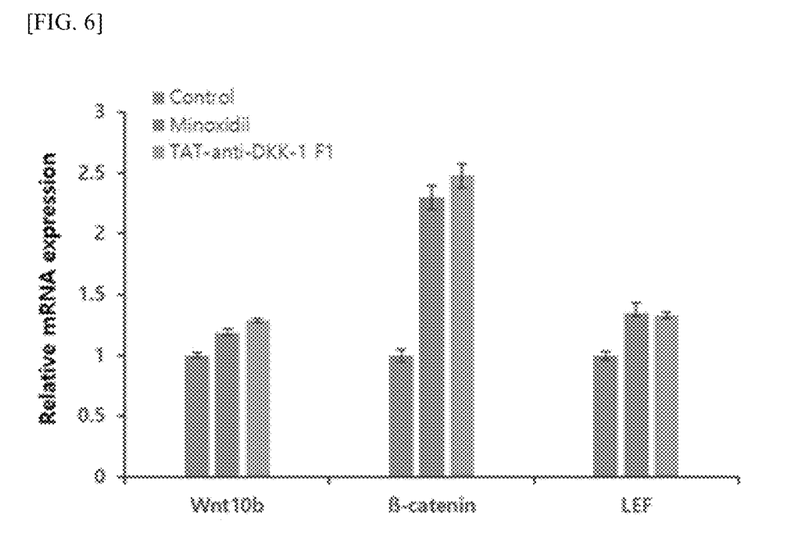
FIG. 6 shows a result of increased expression of Wnt/β-catenin signaling factors by cell-permeable anti-DKK-1 F1 scFv antibody.

Primers of Wnt10b, β-catenin, and LEF used for real-time PCR were synthesized in Macrogen, Inc., and the nucleotide sequences are shown in Table 3. Real-time PCR was performed using TOPreal™ Qper 2X PreMIX, and the results are shown in FIG. 6. TAT-anti-DKK-1 F1 scFv increased the expression of Wnt/β-catenin signaling factors including Wnt10b, β-catenin, and LEF and showed an effect similar to minoxidil which is the alopecia treatment effective in maintaining hair growth through an activity of β-catenin.

2. Analysis of Changes in Expression of Growth Factor VEGF

Figure 7:
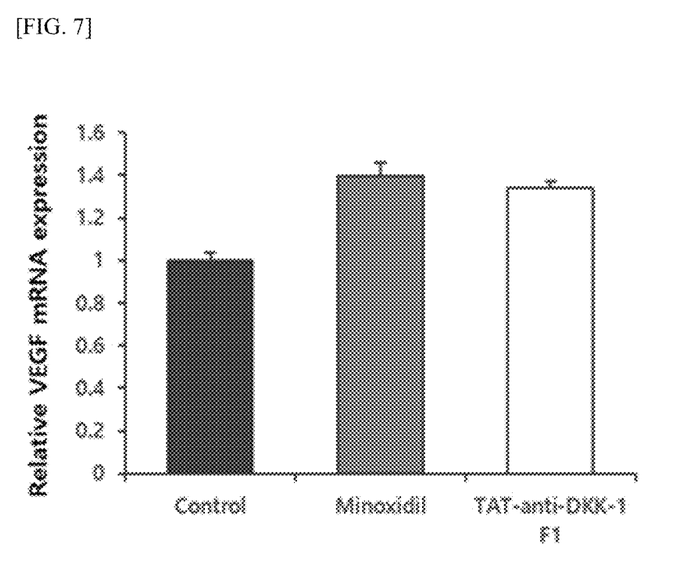
FIG. 7 shows a result of increased expression of growth factor VEGF by cell-permeable anti-DKK-1 F1 scFv antibody.

VEGF, a vascular endothelial growth factor that affects hair growth promotion and hair growth, is involved in promoting the differentiation of hair follicle cells by stimulating angiogenesis. In order to find out whether the TAT-anti-DKK-1 F1 scFv antibody is involved in VEGF expression regulation, the real-time PCR was used as described above. The VEGF primers used therefor are shown in Table 3, and real-time PCR was performed using TOPreal™ Qper 2X PreMIX. As shown in FIG. 7, TAT-anti-DKK-1 F1 scFv also increased the expression of the growth factor VEGF.

TABLE 3

| Gene description | Primers | Sequences |
| --- | --- | --- |
| Wnt10b | F | 5'-CTCTGGGATGTGTAGCCTTC-3' (SEQ ID NO: 9) |
|  | R | 5'-GGCTCTGGAGTTGAGAAGTG-3' (SEQ ID NO: 10) |
| β-catenin | F | 5'-TCTGAGGACAAGCCACAAGATTACA-3' (SEQ ID NO: 11) |

TABLE 3-continued

| Gene description | Primers | Sequences |
| --- | --- | --- |
|  | R | 5'-TGGGCACCAATATCAAGTCCAA-3' (SEQ ID NO: 12) |
| LEF | F | 5'-TGCCAAATATGAATAACGACCCA-3' (SEQ ID NO: 13) |
|  | R | 5'-GAGAAAAGTGCTCGTCACTGT-3' (SEQ ID NO: 14) |
| VEGF | F | 5'-TCTTCAAGCCATCCTGTGTG-3' (SEQ ID NO: 15) |
|  | R | 5'-GCGAGTCTGTGTTTTTGCAG-3' (SEQ ID NO: 16) |
| GAPDH | F | 5'-GACATGCCGCCTGGAGAAAC-3' (SEQ ID NO: 17) |
|  | R | 5'-AGCCCAGGATGCCCTTTAGT-3' (SEQ ID NO: 18) |

Although specific parts of the present disclosure have been described in detail above, it is clear for those skilled in the art that these specific techniques are merely preferred example embodiments and the scope of the present disclosure is not limited thereto. Accordingly, the substantial scope of an example embodiment of the present disclosure will be defined by the appended claims and equivalents thereof.

What is claimed is:

1. An anti-DKK-1 antibody or antigen-binding fragment thereof specifically binding to Dickkopf-related protein 1 (DKK-1), comprising a light chain variable region comprising a light chain CDR1 comprising the amino acid sequence set forth SEQ ID NO: 1, a light chain CDR2 comprising the amino acid sequence set forth SEQ ID NO: 2, and a light chain CDR3 comprising the amino acid sequence set forth SEQ ID NO: 3; and a heavy chain variable region comprising a heavy chain CDR1 comprising the amino acid sequence set forth SEQ ID NO: 4, a heavy chain CDR2 comprising the amino acid sequence set forth SEQ ID NO: 5, and a heavy chain CDR3 comprising the amino acid sequence set forth SEQ ID NO: 6.

2. A fusion anti-DKK-1 antibody or antigen-binding fragment thereof, in which a TAT peptide comprising the amino acid set forth SEQ ID NO: 7 is additionally bound to the antibody or antigen-binding fragment thereof of claim 1.

3. A method of promoting hair growth or preventing hair loss, comprising:
administering a cosmetic composition to a subject, wherein the cosmetic composition comprising the antibody or antigen binding fragment thereof of claim 1 as an active ingredient.

4. The method of claim 3, wherein the composition promotes growth of human dermal papilla cells.

5. The method of claim 3, wherein the composition increases expression of Wnt10b, β-catenin, and LEF which are Wnt/β-catenin signaling factors, and VEGF which is a vascular endothelial cell growth factor.

6. A method of promoting hair growth or preventing hair loss, comprising:
administering a cosmetic composition to a subject, wherein the cosmetic composition comprising the antibody or antigen binding fragment thereof of claim 2 as an active ingredient.

7. The method of claim 6, wherein the composition promotes growth of human dermal papilla cells.

8. The method of claim 6, wherein the composition increases expression of Wnt10b, β-catenin, and LEF which are Wnt/β-catenin signaling factors, and VEGF which is a vascular endothelial cell growth factor.

* * * * *